US008108939B2

(12) United States Patent
Bhatia et al.

(10) Patent No.: US 8,108,939 B2
(45) Date of Patent: Jan. 31, 2012

(54) METHOD AND APPARATUS TO FACILITATE SECURITY-ENABLED CONTENT CACHING

(75) Inventors: Gaurav Bhatia, Foster City, CA (US); Arun Swaminathan, San Carlos, CA (US); Ajay Desai, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 705 days.

(21) Appl. No.: 10/449,202

(22) Filed: May 29, 2003

(65) Prior Publication Data

US 2004/0243839 A1 Dec. 2, 2004

(51) Int. Cl.
*H04L 9/32* (2006.01)
*G06F 21/00* (2006.01)
(52) U.S. Cl. .............................. 726/28; 726/4
(58) Field of Classification Search .......... 726/30, 726/2–4, 26–28; 709/203, 219
See application file for complete search history.

(56) References Cited

U.S. PATENT DOCUMENTS

| 5,351,276 | A | * | 9/1994 | Doll et al. ................ 379/88.17 |
| 5,706,507 | A | * | 1/1998 | Schloss ..................... 707/104.1 |
| 5,941,947 | A | * | 8/1999 | Brown et al. ................. 709/225 |
| 6,049,821 | A | * | 4/2000 | Theriault et al. ............. 709/203 |
| 6,073,168 | A | * | 6/2000 | Mighdoll et al. ............. 709/217 |
| 6,081,900 | A | * | 6/2000 | Subramaniam et al. ........ 726/19 |
| 6,134,597 | A | * | 10/2000 | Rieth et al. ................... 709/237 |
| 6,167,438 | A | * | 12/2000 | Yates et al. .................... 709/216 |
| 6,332,157 | B1 | * | 12/2001 | Mighdoll et al. ............. 709/217 |
| 6,339,423 | B1 | * | 1/2002 | Sampson et al. ............. 715/854 |
| 6,397,217 | B1 | * | 5/2002 | Melbin ............................ 707/10 |
| 6,490,625 | B1 |   | 12/2002 | Islam et al. .................. 709/229 |
| 6,542,967 | B1 | * | 4/2003 | Major ............................ 711/134 |
| 6,615,235 | B1 | * | 9/2003 | Copeland et al. ............. 709/203 |

(Continued)

FOREIGN PATENT DOCUMENTS

EP 1 221 795 A2 10/2002 ............... 29/6

(Continued)

OTHER PUBLICATIONS

"IBM Tivoli Access Manager Plug-in for Edge Server: User's Guide. Version 3.9" International Business Machine Corporation 'Online! Apr. 2002, XP-002294640 Retrieved from the Internet: URL:http://publib.boulder.ibm.com/tividd/td/1TAME/GC23-4685-00/en_US/PDF/esmst.pdf> retrieved on Sep. 1, 2004 pp. 2-4; figures 1, 2 p. 19.

(Continued)

*Primary Examiner* — Zachary A Davis
(74) *Attorney, Agent, or Firm* — Shun Yao; Park, Vaughan, Fleming & Dowler LLP

(57) ABSTRACT

One embodiment of the present invention provides a system that facilitates security-enabled content caching. The system operates by first receiving a request from a user at a cache server for restricted content, wherein the cache server stores content for an application server. Next, the system determines if the restricted content is located on the cache server. If so, the system determines if the user is authorized to access the restricted content. If the user is authorized to access the restricted content, the system provides the restricted content to the user from the cache server. Providing the restricted content from the cache server eliminates the time consuming operations involved in requesting and receiving the restricted content from the application server.

14 Claims, 7 Drawing Sheets

U.S. PATENT DOCUMENTS

| | | | |
|---|---|---|---|
| 6,763,370 B1 * | 7/2004 | Schmeidler et al. | 709/203 |
| 6,763,468 B2 * | 7/2004 | Gupta et al. | 726/2 |
| 6,832,222 B1 * | 12/2004 | Zimowski | 707/9 |
| 6,931,435 B2 * | 8/2005 | Aoki et al. | 709/213 |
| 6,959,122 B2 * | 10/2005 | McIntyre | 382/305 |
| 7,114,180 B1 * | 9/2006 | DeCaprio | 726/18 |
| 7,237,108 B2 * | 6/2007 | Medvinsky et al. | 713/160 |
| 7,350,075 B1 * | 3/2008 | Eastham | 713/168 |
| 7,363,361 B2 * | 4/2008 | Tewari et al. | 709/223 |
| 7,444,413 B2 * | 10/2008 | Saxena | 709/229 |
| 7,461,262 B1 * | 12/2008 | O'Toole, Jr. | 713/182 |
| 7,467,160 B2 * | 12/2008 | McIntyre | 707/104.1 |
| 7,555,770 B2 * | 6/2009 | Gottipati et al. | 726/2 |
| 7,660,902 B2 * | 2/2010 | Graham et al. | 709/229 |
| 7,721,339 B2 * | 5/2010 | Madison et al. | 726/27 |
| 7,793,342 B1 * | 9/2010 | Ebrahimi et al. | 726/8 |
| 7,818,792 B2 * | 10/2010 | Shamsaasef et al. | 726/10 |
| 2003/0065917 A1 * | 4/2003 | Medvinsky et al. | 713/160 |
| 2003/0097564 A1 * | 5/2003 | Tewari et al. | 713/171 |
| 2003/0200313 A1 * | 10/2003 | Peterka et al. | 709/225 |
| 2004/0024886 A1 * | 2/2004 | Saxena | 709/229 |

FOREIGN PATENT DOCUMENTS

WO     WO 02099716 A1 * 12/2002

OTHER PUBLICATIONS

"Nestscape Proxy Server 3.5 Administrator's Guide for UNIX" Online! Feb. 25, 1998, XP-002223540 Retrieved from the Internet: URL:http//developer.netscape.com/docs/manuals/proxy/adminux/index.html>'retrieved on Apr. 12, 2002! p. 17: How Caching Works; figure 9.1, p. 23: Caching Pages that Require Authentication.

\* cited by examiner

METHOD AND APPARATUS TO FACILITATE SECURITY-ENABLED CONTENT CACHING

BACKGROUND

1. Field of the Invention

The present invention relates to cache servers. More specifically, the present invention relates to a method and an apparatus to facilitate security-enabled content caching at a cache server.

2. Related Art

Computer users, both business and individual, are turning to the World Wide Web for rapid dissemination of content. This content can include business data such as financial status and inventory, and general data such as world news. Providers of this content use many devices and methods to assist the rapid delivery of content to users and to reduce the number of "hits" requesting the content that are received at the content source. One of these devices is a cache server, which stores previously accessed data, and then serves this previously accessed data in response to subsequent requests.

FIG. 1 illustrates a cache server 104 that supplies content received from an application server 106 to a browser 102. During operation, a user (not shown) at browser 102 makes a request 108 for content from application server 106. Request 108 is routed to cache server 104 where cache server 104 determines if the content is available at cache server 104. If so, cache server 104 supplies content 114 to browser 102. If the content is not available at cache server 104, cache server 104 makes a request 110 to application server 106 for the content. Application server 106 creates the content and supplies the content 112 to cache server 104. Cache server 104 then saves a copy of content 112 and supplies the content to browser 102 as content 114. Note that creating the content at application server 106 may be a lengthy operation.

FIG. 2 illustrates multiple cache servers supplying content to browsers. The system includes application server 202, cache servers 204, 208, 212, and 216, and browsers 206, 210, 214, and 218. Cache servers 204, 208, 212, and 216 can be located in different geographical areas to provide localized access to content from application server 202. For example, cache server 204 may be located in Japan, cache server 208 may be located in the United States, cache server 212 may be located in Europe, and cache server 216 may be located in India. Note that there may be more browsers communicating with each cache server than is shown in FIG. 2. These browsers, cache servers, and application server 202 operate in a similar manner as described above in conjunction with FIG. 1.

These content caching servers (cache servers) have traditionally been used only for rapid delivery of "public" (i.e., unrestricted) content to content consumers. However, in many situations, it is desirable to be able to deliver certain types of sensitive content to restricted subsets of users. In these situations, existing cache server designs do not provide mechanisms to deliver this content efficiently. In particular, content caches do not provide support to verify user identity and to apply access control checks before delivering the content to a user. Thus, restricted content presently has to be obtained from a content-originating server (an application server) so that the application server can apply the access control logic. This results in slower response to the user, reduced capacity/scalability in the system, and increased data traffic at the application server.

Hence, what is needed is a method and an apparatus that facilitates efficient content caching for restricted content without the problems described above.

SUMMARY

One embodiment of the present invention provides a system that facilitates security-enabled content caching. The system operates by first receiving a request from a user at a cache server for restricted content, wherein the cache server stores content for an application server. Next, the system determines if the restricted content is located on the cache server. If so, the system determines if the user is authorized to access the restricted content. If the user is authorized to access the restricted content, the system provides the restricted content to the user from the cache server. Providing the restricted content from the cache server eliminates the time consuming operations involved in requesting and receiving the restricted content from the application server.

In a variation of this embodiment, if the restricted content is not located at the cache server, the system requests an access authorization for the user from a security infrastructure. If the access authorization is received, the system requests the restricted content from the application server. After receiving the restricted content, the system caches the restricted content and provides the restricted content to the user.

In a further variation, determining if the user is authorized to access the restricted content involves first requesting the access authorization for the user from the security infrastructure and then, if the access authorization is received, providing the restricted content to the user.

In a further variation, if the restricted content is not located at the cache server, the system requests the restricted content from the application server on behalf of the user. In response, the system receives the restricted content from the application server, including an access tag that provides access authorization information. The system caches the restricted content and forwards the access tag to a security infrastructure. Finally, the system provides the restricted content to the user.

In a further variation, determining if the user is authorized to access the restricted content involves first requesting an access authorization for the user from the security infrastructure. The security infrastructure uses the access tag to determine if the user is authorized to receive the restricted content. Upon receiving the access authorization, the system provides the restricted content to the user.

In a further variation, if the restricted content is not located at the cache server, the system requests the restricted content from the application server on behalf of the user. After receiving the restricted content from the application server, the system caches the restricted content and provides the restricted content to the user.

In a further variation, determining if the user is authorized to access the restricted content involves: requesting an authorization from the application for the user to access the restricted content; and if the authorization is received, providing the restricted content to the user.

DEFINITIONS

Cache server: An entity, which takes part in real-time content delivery as well as non-real-time content delivery, such as in the case of a search engine, which indexes content off-line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Centrally Managed Access

Figure 1:
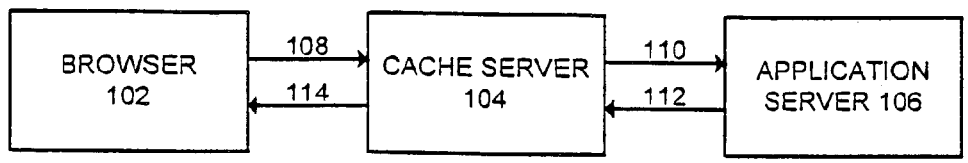
FIG. 1 illustrates a cache server that supplies content received from an application server to a browser.
Figure 2:
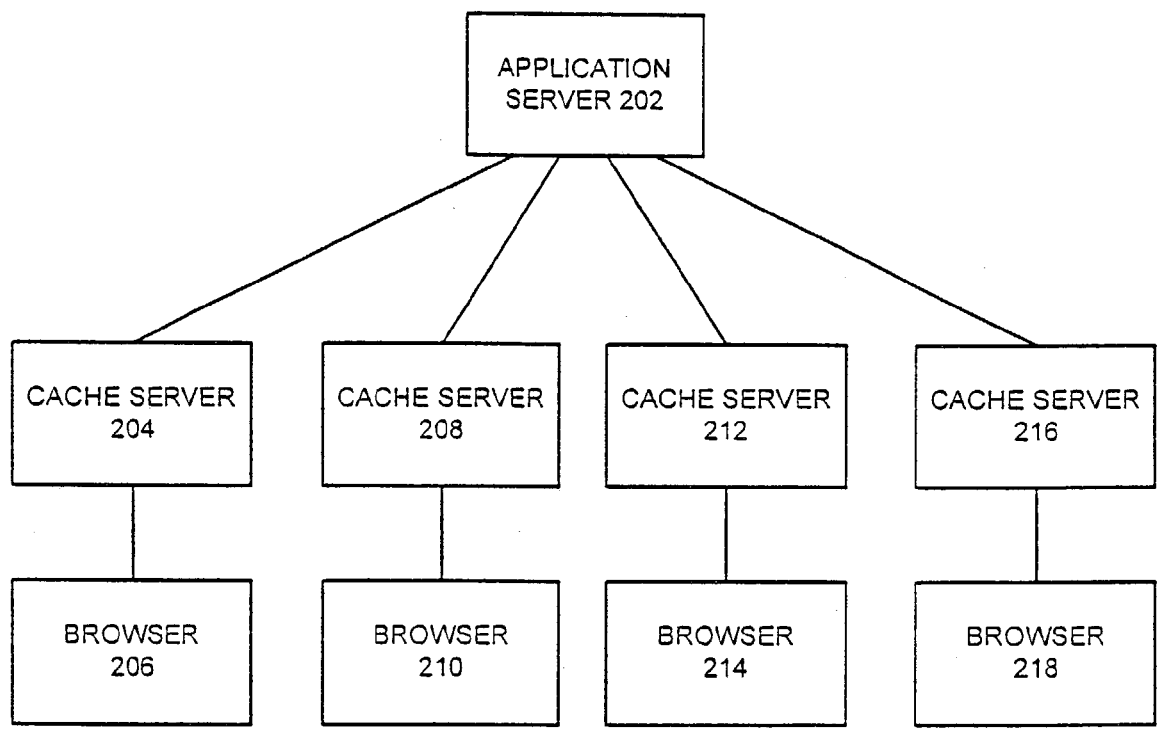
FIG. 2 illustrates multiple cache servers supplying content to browsers.
Figure 3:
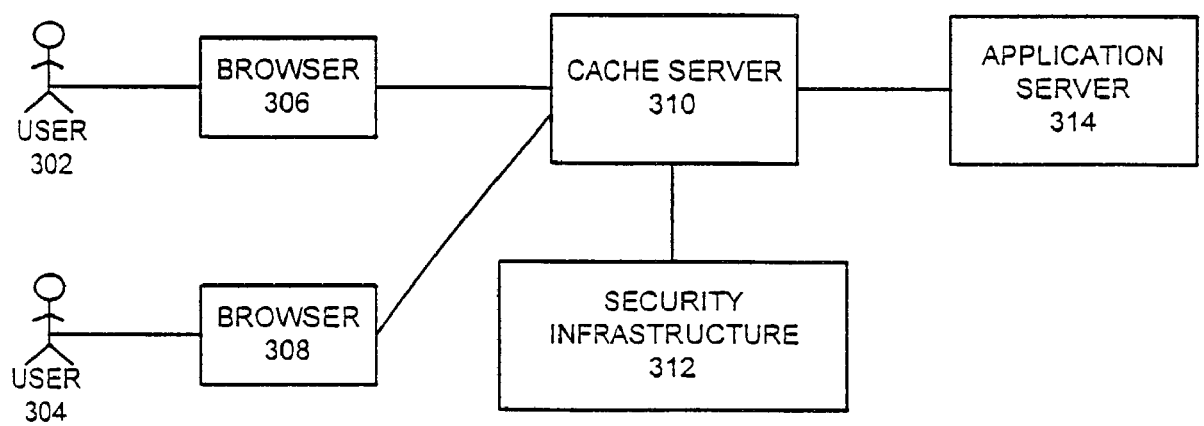
FIG. 3 illustrates a cache server for centrally managed access in accordance with an embodiment of the present invention.

FIG. 3 illustrates a cache server 310 for centrally managed access in accordance with an embodiment of the present invention. Users 302 and 304 communicate with cache server 310 using browsers 306 and 308, respectively.

During operation, cache server 310 receives a request for restricted content from a browser, say browser 306, on behalf of a user, such as user 302. In response to the request, cache server 310 requests access authorization from security infrastructure 312 for user 302 to receive the restricted content. If access authorization is received and the restricted content is not available in cache server 310, cache server 310 requests the restricted content from application server 314. Upon receiving the restricted content from application server 314, cache server 310 stores the restricted content and provides a copy of the restricted content to user 302 at browser 306.

If cache server 310 subsequently receives a request for the same restricted content from a different user, say user 304 at browser 308, cache server 310 similarly requests access authorization from security infrastructure 312. If access authorization is received for user 304, cache server 310 provides the restricted content, which was previously stored at cache server 310. Obtaining the restricted content from cache server 310 eliminates the time and communication traffic involved in contacting application server 314, generating the restricted content, and returning the restricted content to cache server 310.

Centrally Managed Access Process

Figure 4:
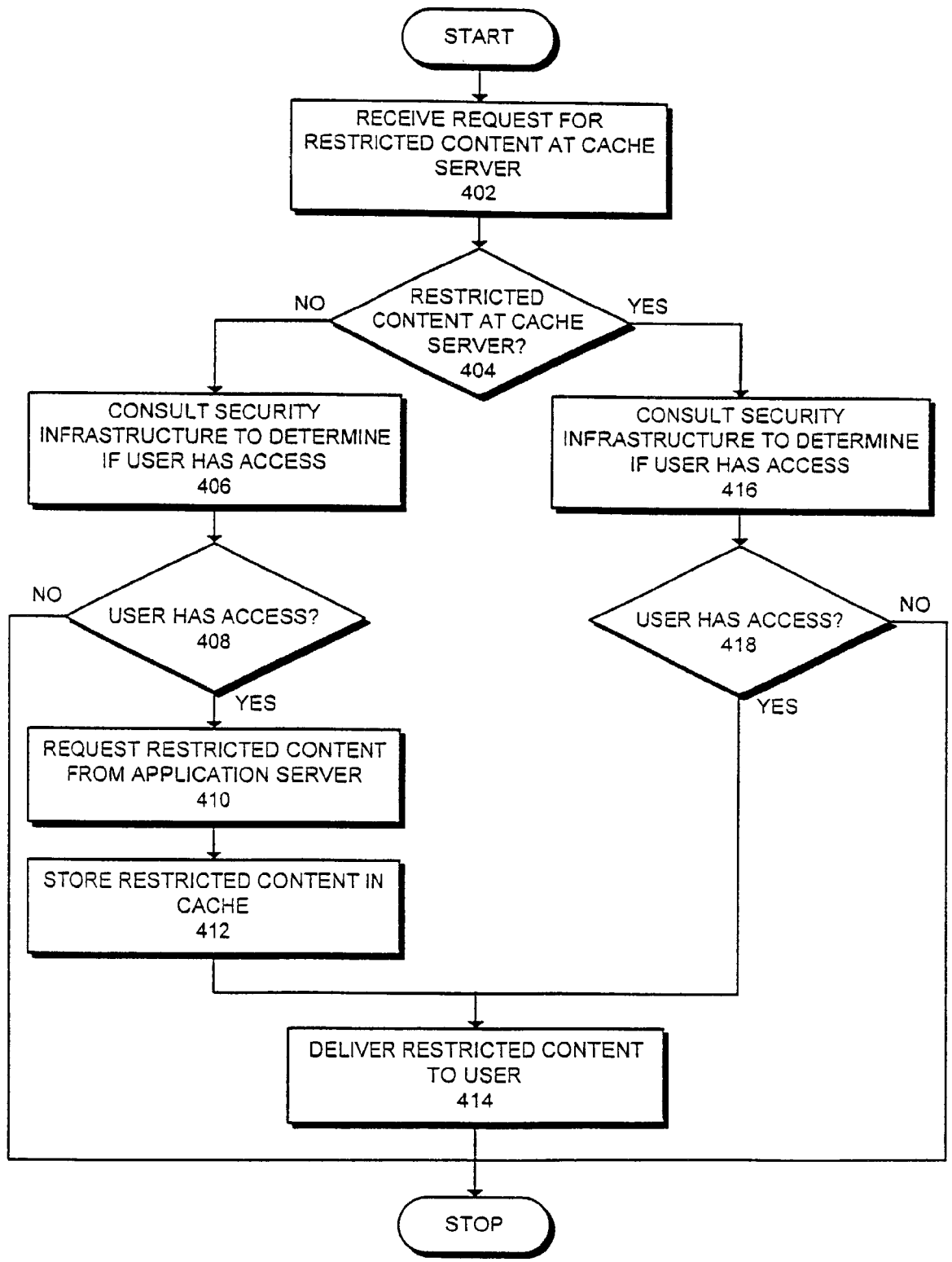
FIG. 4 presents a flowchart illustrating the process of centrally managed access in accordance with an embodiment of the present invention.

FIG. 4 presents a flowchart illustrating the process of centrally managed access in accordance with an embodiment of the present invention. In centrally managed access, cache server 310 communicates with security infrastructure 312 to determine if the users are authorized to access restricted content from application server 314. The system starts when a request is received at a cache server for restricted content (step 402). Next, the system determines if the restricted content is stored at the cache server (step 404).

If the restricted content is not available at the cache server, the system consults the security infrastructure to determine if the user has access to the restricted content (step 406). If the user does not have access to the restricted content, the process is terminated (step 408). Otherwise, the system requests the restricted content from the application server (step 410). Upon receiving the restricted content, the cache server stores the restricted content (step 412). Finally, the cache server forwards the restricted content to the user (step 414).

If the restricted content is available at the cache server at step 404, the system consults the security infrastructure to determine if the user has access to the restricted content (step 416). If the user does not have access to the restricted content, the process is terminated (step 418). Otherwise, the system forwards the restricted content to the user at step 414.

Externalizable Application Managed Access

Figure 5:
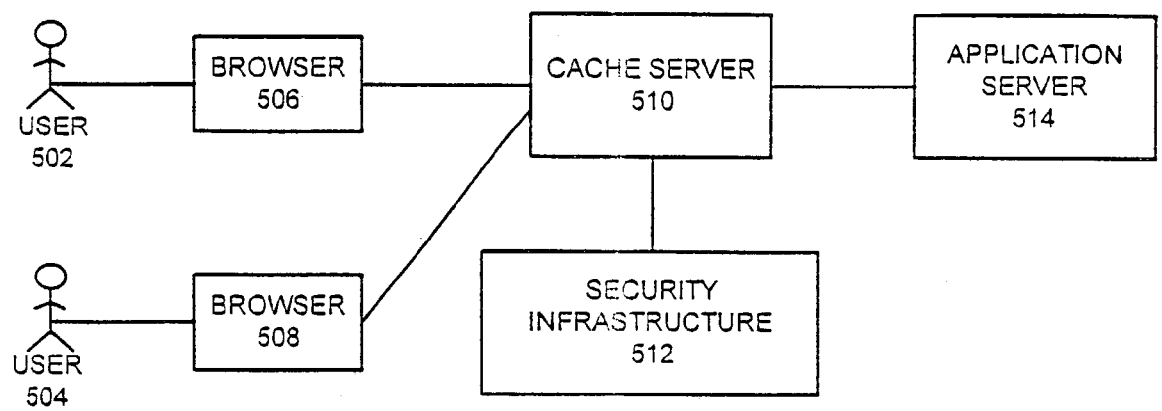
FIG. 5 illustrates a cache server for externalizable application managed access in accordance with an embodiment of the present invention.

FIG. 5 illustrates a cache server 510 for externalizable application managed access in accordance with an embodiment of the present invention. As is illustrated in FIG. 5, users 502 and 504 communicate with cache server 510 using browsers 506 and 508, respectively. In externalizable application managed access, application server 514 determines if the users are authorized to access restricted content from application server 514. If so, application server 514 sends a tag with the restricted content. This tag includes metadata describing which users are authorized to access the restricted content. Cache server 510 forwards this tag to security infrastructure 512.

During operation, cache server 510 receives a request for restricted content from a browser, say browser 506, on behalf of a user (user 502 in this case). In response to the request, cache server 510 determines if the restricted content is available in the cache. If not, cache server 510 requests the restricted data from application server 514 on behalf of user 502. Application server 514 then determines which users are authorized to access the restricted content and provides a tag with the restricted content. Upon receiving the restricted content and the tag, cache server 510 forwards the tag to security infrastructure 512, saves the restricted content in the cache, and provides the restricted content to user 502.

In a subsequent operation, if cache server 510 receives a request for the same restricted content from a different user, say user 504 at browser 508, cache server 510 requests access authorization from security infrastructure 512. Security infrastructure 512 uses the tag previously received to determine if user 504 is authorized to access the restricted content. If access authorization is received for user 504 from security infrastructure 512, cache server 510 provides the restricted content from the content previously stored by cache server 510. Obtaining the restricted content from the cache server in this manner eliminates the time and communication traffic involved in contacting application server 514, generating the restricted content, and returning the restricted content to cache server 510.

Externalizable Application Managed Access Process

Figure 6:
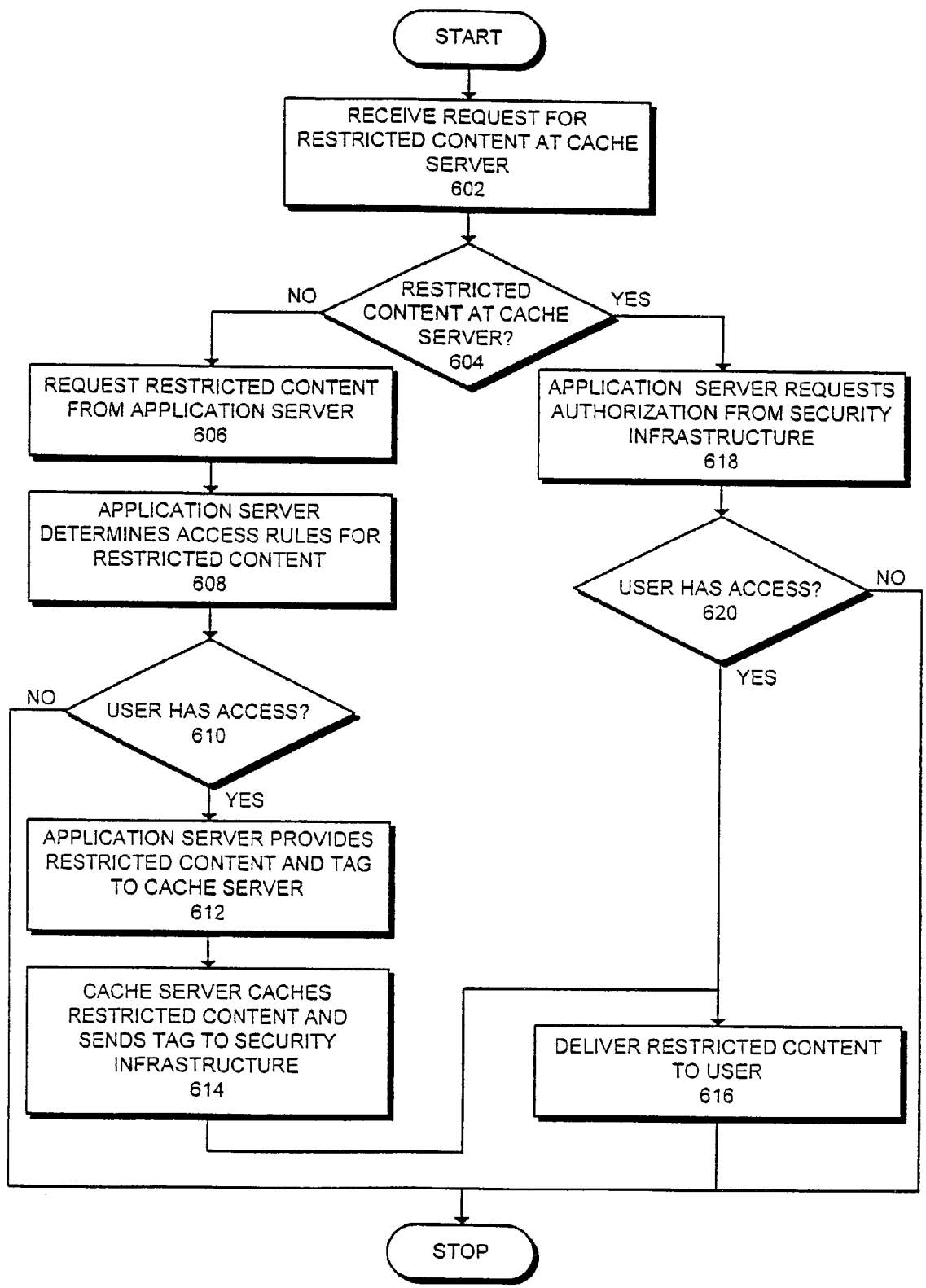
FIG. 6 presents a flowchart illustrating the process of externalizable application managed access in accordance with an embodiment of the present invention.

FIG. 6 presents a flowchart illustrating the process of externalizable application managed access in accordance with an embodiment of the present invention. The system starts when a request is received at a cache server for restricted content (step 602). In response to this request, the system determines if the restricted content is stored in the cache (step 604).

If the restricted content is not stored at the cache server, the cache server requests the restricted content from the application server on behalf of the user (step 606). The application server determines the access rules for the restricted content, including whether the user is authorized to access the restricted content (step 608). If the user is not authorized to access the restricted content, the process is terminated (step 610). Otherwise, the application server provides the restricted content and a tag to the cache server (step 612). This tag includes metadata defining who has access to the restricted content.

Upon receiving the restricted content and the tag, the cache server stores the restricted content in the cache, and sends the tag to the security infrastructure (step 614). Finally, the cache server delivers the restricted content to the user (step 616).

If the restricted content is stored at the cache server at step 604, the cache server requests an access authorization from the security infrastructure (step 618). The security infrastructure determines whether the user has access by using the previously provided tag. If the user does not have access, the process is terminated (step 620). Otherwise, the cache server delivers the restricted content to the user from the cache at step 616.

Non-Externalizable Application Managed Access

Figure 7:
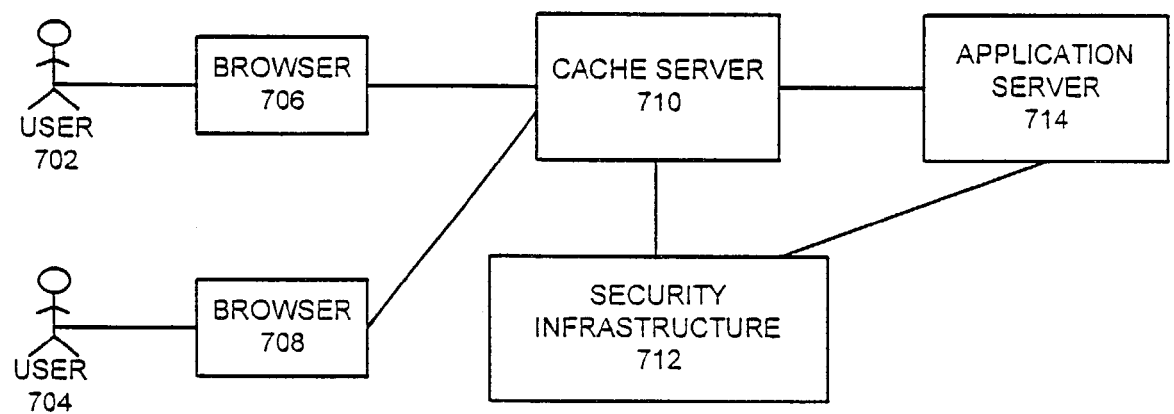
FIG. 7 illustrates a cache server for non-externalizable application managed access in accordance with an embodiment of the present invention.

FIG. 7 illustrates a cache server for non-externalizable application managed access in accordance with an embodiment of the present invention. As is illustrated in FIG. 7, users 702 and 704 communicate with cache server 710 using browsers 706 and 708, respectively. In non-externalizable application managed access, application server 714 always determines if the user is authorized to access restricted content from application server 714.

During operation, cache server 710 receives a request for restricted content from a browser, say browser 706, on behalf of a user (user 702 in this case). In response to the request, cache server 710 determines if the restricted content is available in the cache. If not, cache server 710 requests the restricted data from application server 714 on behalf of user 702. Application server 714 determines if the user is authorized to access the restricted content and, if so, provides the restricted content to cache server 710. Upon receiving the restricted content, cache server 710 saves the restricted content in the cache and provides the restricted content to user 702.

If cache server 710 subsequently receives a request for the same restricted content from a different user (say user 704) at browser 708, cache server 710 requests access authorization from security infrastructure 712. Security infrastructure 712, in turn, requests authorization from application server 714. If access authorization is received for user 704 from application server 714, security infrastructure 712 forwards the authorization to cache server 710. Cache server 710 then provides the restricted content from the content previously stored by cache server 710. Providing the restricted content from the cache eliminates the time and communication traffic involved in contacting application server 714, generating the restricted content, and returning the restricted content to cache server 710. Note that a minimal amount of time and communication traffic is required to contact application server 714 to obtain the access authorization.

Non-Externalizable Application Managed Access Process

Figure 8:
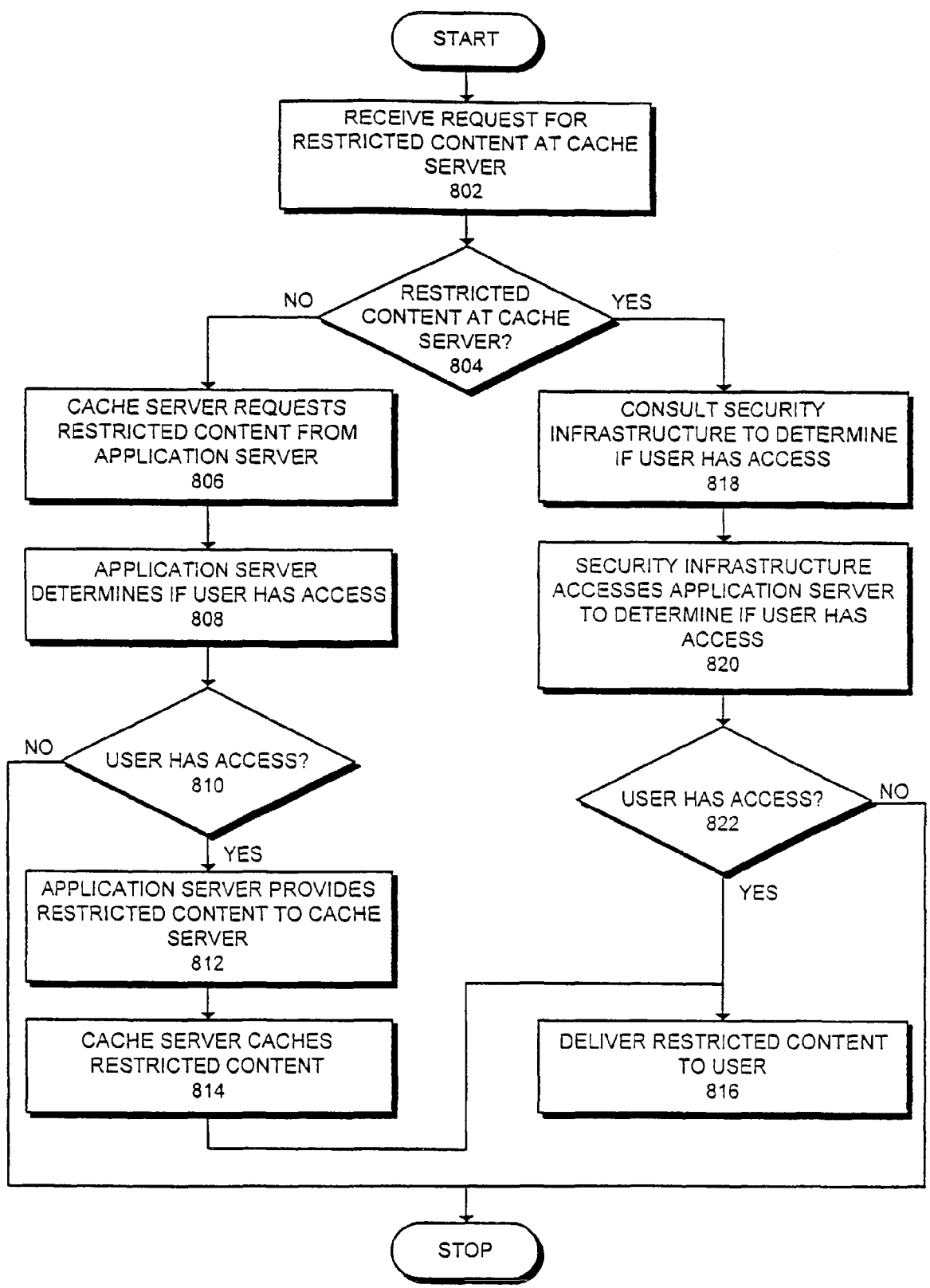
FIG. 8 presents a flowchart illustrating the process of non-externalizable application managed access in accordance with an embodiment of the present invention.

FIG. 8 presents a flowchart illustrating the process of non-externalizable application managed access in accordance with an embodiment of the present invention. The system starts when a request is received for restricted content at the cache server (step 802). In response to this request, the cache server determines if the restricted content is available at the cache server (step 804).

If the restricted content is not available at the cache server, the cache server requests the restricted content from the application server (step 806). The application server then determines if the user can access the restricted content (step 808). If the user does not have access to the restricted content, the process is terminated (step 810).

If the application server determines that the user has access to the restricted content, the application server provides the restricted content to the cache server (step 812). The cache server stores this restricted content in the cache (step 814). Finally, the cache server delivers the restricted content to the user (step 816).

If the restricted content is available at the cache server at step 804, the cache server requests access authorization from the security infrastructure (step 818). The security infrastructure, in turn, requests authorization from the application server (step 820). If access authorization is not received from the application server, the process is terminated (step 822). If access authorization is received from the application server, the security infrastructure provides the authorization to the cache server. The cache server then delivers the restricted content to the user at step 816.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate security-enabled content caching, comprising:
   receiving, at a cache server, a request for restricted content from a first user;
   determining whether the requested restricted content is present at the cache server;
   in response to the requested restricted content not being present at the cache server, requesting, by the cache server, the restricted content from an application server, which determines whether the first user is authorized to access the requested restricted content;
   in response to the application server determining that the first user is authorized, receiving, at the cache server, from the application server, the requested restricted content and user-identifying information specific to the requested restricted content, wherein the user-identifying information identifies a number of users that are authorized to access the requested restricted content;
   forwarding the user-identifying information from the cache server to a security infrastructure, which is configured to store the user-identifying information and use the stored user-identifying information to authorize a subsequent request from a second user to access the restricted content at the cache server;
   storing at the cache server the restricted content; and
   delivering the restricted content to the first user.

2. The method of claim 1, wherein in response to the restricted content being present at the cache server, the method further comprises:

requesting an access authorization for the first user from the security infrastructure, wherein the security infrastructure determines whether the first user is authorized to access the restricted content based on previously received user-identifying information; and in response to receiving the access authorization, providing the restricted content to the first user.

3. The method of claim 1, wherein in response to the restricted content not being present at the cache server, the method further comprises:

requesting the restricted content from an application located at the application server on behalf of the first user; and receiving the restricted content from the application.

4. The method of claim 3, wherein the application server determines whether the first user is authorized to access the requested restricted content by:

requesting an authorization from the application for the first user to access the restricted content; and in response to receiving the authorization, providing the restricted content to the first user.

5. The method of claim 1, wherein the user-identifying information comprises metadata describing which users are authorized to access the restricted content.

6. The method of claim 1, wherein the user-identifying information is included in a tag associated with the restricted content.

7. The method of claim 1, wherein delivering the restricted content to the first user comprises transmitting the restricted content to a browser associated with the first user.

8. A non-transitory computer-readable storage medium storing instructions that when executed by a computer cause the computer to perform a method to facilitate security-enabled content caching, the method comprising:

receiving, at a cache server, a request for restricted content from a first user;

determining whether the requested restricted content is present at the cache server;

in response to the requested restricted content not being present at the cache server, requesting, by the cache server, the restricted content from an application server, which determines whether the first user is authorized to access the requested restricted content;

in response to the application server determining that the first user is authorized, receiving, at the cache server, from the application server, the requested restricted content and user-identifying information specific to the requested restricted content, wherein the user-identifying information identifies a number of users that are authorized to access the requested restricted content;

forwarding the user-identifying information from the cache server to a security infrastructure, which is configured to store the user-identifying information and use the stored user-identifying information to authorize a subsequent request from a second user to access the restricted content at the cache server;

storing at the cache server the restricted content; and delivering the restricted content to the first user.

9. The computer-readable storage medium of claim 8, wherein in response to the restricted content being present at the cache server, the method further comprises:

requesting an access authorization for the first user from the security infrastructure, wherein the security infrastructure determines whether the first user is authorized to access the restricted content based on previously received user-identifying information; and in response to receiving the access authorization, providing the restricted content to the first user.

10. The computer-readable storage medium of claim 8, wherein in response to the restricted content not being present at the cache server, the method further comprises:

requesting the restricted content from an application located at the application server on behalf of the first user; and receiving the restricted content from the application.

11. The computer-readable storage medium of claim 10, wherein the application server determines whether the first user is authorized to access the requested restricted content by:

requesting an authorization from the application for the first user to access the restricted content; and in response to receiving the authorization, providing the restricted content to the first user.

12. The computer-readable storage medium of claim 8, wherein the user-identifying information comprises metadata describing which users are authorized to access the restricted content.

13. The computer-readable storage medium of claim 8, wherein the user-identifying information is included in a tag associated with the restricted content.

14. The computer-readable storage medium of claim 8, wherein delivering the restricted content to the first user comprises transmitting the restricted content to a browser associated with the first user.

* * * * *

UNITED STATES PATENT AND TRADEMARK OFFICE
CERTIFICATE OF CORRECTION

PATENT NO.       : 8,108,939 B2
APPLICATION NO.  : 10/449202
DATED            : January 31, 2012
INVENTOR(S)      : Bhatia et al.

It is certified that error appears in the above-identified patent and that said Letters Patent is hereby corrected as shown below:

On Title Page 2, Item (56) References Cited, in column 2, under "Other Publications", line 1, delete ""Nestscape" and insert -- "Netscape --, therefor.

Signed and Sealed this
First Day of May, 2012

David J. Kappos
*Director of the United States Patent and Trademark Office*